United States Patent Office 3,845,209
Patented Oct. 29, 1974

3,845,209
PHARMACEUTICAL PREPARATION FOR THERAPEUTIC TREATMENT, AND METHOD OF CARRYING OUT THERAPEUTIC TREATMENTS
Jean Heusser, Langnau, and Max Glasbrenner, Zurich, Switzerland, assignors to Hommel Aktiengesellschaft, Adliswil, Switzerland
No Drawing. Filed May 17, 1972, Ser. No. 254,160
Claims priority, application Switzerland, May 26, 1971, 7,728/71
Int. Cl. A61k 27/00
U.S. Cl. 424—254
2 Claims

ABSTRACT OF THE DISCLOSURE

Pure 5-allyl-5-(2-hydroxyethyl) barbituric acid which does not exhibit hypnotic effects is obtained by forming a reaction product of diethyl ester of monoallyl malonic acid and alkoxy-alkyl chloride, alkenyloxyalkyl chloride or hydroxyalkyl chloride, condensing the product obtained with urea while splitting off acetaldehyde so as to effect formation of the barbituric acid ring structure and recovering pure product from the reaction mixture. This non-hypnotic product improves the function of brain and heart cells, notably their capacity to utilize oxygen and glucose.

---

The present invention relates to a new and improved process of producing 5-allyl-5-(2-hydroxyethyl) barbituric acid free of hypnotic effects, an improved pharmaceutical preparation for therapeutic treatment, and improved method for carrying out such therapeutic treatment.

Derivatives of barbituric acid are well known for their narcotic effects and such properties have long been utilized for therapeutic purposes. Surprisingly, it has now been found that 5-allyl-5-(2-hydroxyethyl) barbituric acid of formula (I)

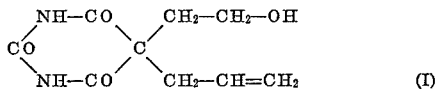

has no hypnotic effect and exhibits new and unexpected pharmacological properties provided it is free from impurities. Notable among such new pharmacological properties is the increase of the utilization capacity of brain and heart cells for oxygen and glucose. The resistance against oxygen deficiency will be greatly increased.

Further, it is of remarkable importance that 5-allyl-5-(2-hydroxyethyl) barbituric acid (also referred to below as "HH 10087") positively influences reduced learning capacity of test animals in the maze test, such reduction of the learning capacity having been caused by Cardiazol-shock.

Accordingly, it is an objective of this invention to provide a process of producing pure non-hypnotic 5-allyl-5-(2-hydroxyethyl) barbituric acid which has the unexpected pharmacological properties mentioned above.

Another object of the invention relates to a new and improved pharmaceutical preparation for treating conditions encompassing a reduced utilization capacity of brain and heart cells for oxygen and glucose in that this preparation contains as the active component pure 5-allyl-5-(2-hydroxyethyl) barbituric acid which is free of hypnotic effects.

A further object of the invention relates to a method of treating conditions encompassing a reduced utilization capacity of brain and heart cells for oxygen and glucose in that a patient is dispensed an effective amount of a pharmaceutical preparation containing as the active component pure 5-allyl-5-(2-hydroxyethyl) barbituric acid which is free of hypnotic effects.

Now, in order to implement these and still further objects of the invention, which will become more readily apparent as the description proceeds, the inventive process is manifested by the features of adducting to the diethyl ester of monoallyl malonic acid of formula (II)

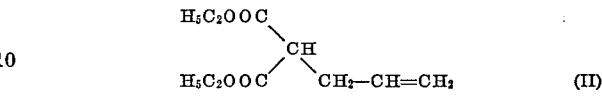

a compound of formula (III)

$$R\text{—}Cl \quad (III)$$

in which R is alkoxyalkyl, alkenyloxyalkyl or hydroxyalkyl, closing the barbituric acid ring by condensing the product of adduction obtained with urea while splitting off acetaldehyde and recovering 5-allyl-5-(2-hydroxyethyl) barbituric acid from the mixture obtained.

Preferred compounds of formula (III) for use in this process are 2-chlorovinyl ethylether and 2-chloroethanol.

The progress of the reaction can be illustrated by means of the following scheme of reaction:

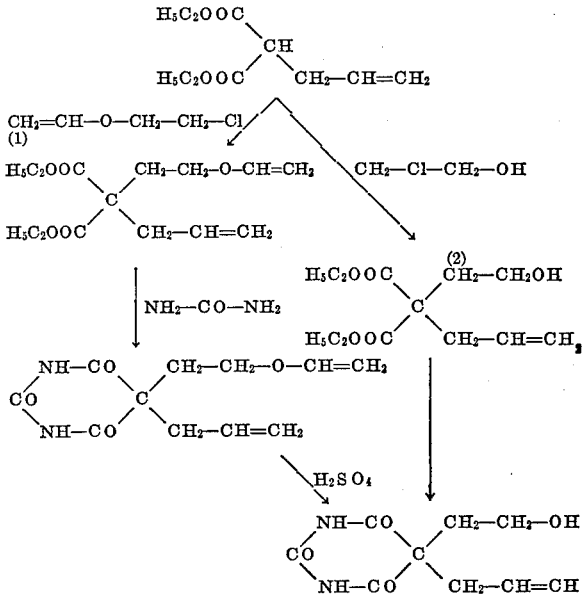

Recovery of the 5-allyl-5-(2-hydroxyethyl) barbituric acid of formula (I) from the reaction mixture still containing diallyl barbituric acid formed as a by-product in the synthesis preferably is effected by treating the mixture with a chlorinated hydrocarbon, e.g. chloroform or ethylene chloride. In such treatment, diallyl barbituric acid present as impurity will be dissolved and removed while 5-allyl-5-(2-hydroxyethyl) barbituric acid which is substantially insoluble in chlorinated hydrocarbon remains in pure form as a residue. Pure 5-allyl-5-(2-hydroxyethyl) barbituric acid thus obtained has a melting point of from 163–165° C. (corrected), no sublimation occurring upon melting, and is free of hypnotic side effects.

Production of pure 5-allyl-5-(2-hydroxyethyl) barbituric acid of formula (I) is particularly problematic because, on the one hand, a product containing diallyl barbituric acid as an impurity, that is, a product generally obtained by carrying out the process, is not free of hypnotic effects, c.f. A. Buzas, Bull. soc. chim. France (1962), 267–271, who obtained a product with a strongly sedative effect and a melting point of 170–171° C. (sublimation occurring), and since, on the other hand, the formation of diallyl barbituric acid present as an impurity is practically not avoidable because the diethylester of monoallyl malonic acid of formula (II) which is to be used as a starting material cannot be produced in 100% purity but always will contain the diethylester of diallyl malonic acid as impurity.

Accordingly, production of pure 5-allyl-5-(2-hydroxyethyl) barbituric acid free of hypnotic effects will be possible only according to the invention process, particularly the purification process suggested therein.

Subsequently, the pharmacological properties of 5-allyl-5-(2-hydroxyethyl) barbituric acid obtained according to the invention will be discussed in more detail.

EFFECTS UPON OXYGEN DEFICIENCY -ELECTROENCEPHALOGRAM (-EEG) AND -ELECTROCARDIOGRAM (-EKG)

Investigations by U. Weber, H. Coors, G. Jung and G. Quadbeck, at the Neurological Institute of the University of Homburg/Saar, Neurochemical Department (unpublished).

The test animals used were rats with a high susceptibility to audiogenically induced epileptic spasms. Electrodes were implanted in the rats and the electrodes were connected with an electrocardiograph or EEG measuring and recording device. The currents producing the EKG were derived through two injection needles. The test animals were placed into a depressurization chamber. While measuring both EEG and EKG, the depressurization chamber was simultaneously brought to a nominal altitude of 11,000 meters, and, subsequently, normal pressure was reestablished by closing the vacuum pump and opening a pressure equalization valve. Pathological changes which can be observed under such conditions will influence both EKG and EEG.

To evaluate therapeutic effects as evidenced by the EEG, the following criteria were applied: When pathological changes after medication, i.e. application of the drug to be tested, were observed at nominal altitudes greater than those observed in a control or preliminary test without application of active substance, or if such changes were less pronounced after medication, or did not appear at all, this was judged to constitute a positive therapeutic effect.

RESULTS

Under the test conditions described the compounds were clearly effective. The resistance of the heart and of the central nervous system to oxygen deficiency was increased regularly and significantly. Without application of treating substance, the test animals approached black-out when test conditions corresponded with an altitude of 9000 meters. The derivations showed a strong pathological change. The heart frequency, normally in the range of about 480–540 min., is reduced to about 150 min. and is irregular. Under the influence of 200 mg./kg. HH 10087, the EKG remains substantially normal and the EEG will show only slight pathological changes.

In a permanent test, the test animals were injected with 100 mg./kg. of the drug for a period of 8 days. Thereafter, the EEG was taken under conditions of oxygen deficiency. The animals were subjected to conditions corresponding to nominal altitudes of 10,500–11,000 meters. In all animals the resistance of the brain to oxygen deficiency showed scarcely any pathological change but corresponds substantially with the observations under normal pressure.

MAZE TEST

In the maze test, the memory performance of 5-allyl-5-(2-hydroxyethyl) barbituric acid was tested for several days. Using rats as test animals, the number of errors made and the time required for passing the maze were measured daily. The motivator for passing the maze was food delivered after completing the effort.

In one group of test animals the learning effect from previously passing the maze was wiped out by means of Cardiazol-shock and after application of 100 mg./kg./day of HH 10087. A control group of test animals did not receive HH 10087. After passing the maze, the animals of the control group received a Cardiazol-shock to wipe out the memory impact of previous maze passing. A third group of test animals received neither HH 10087 nor Cardiazol ("Cardiazol" is a trademark for pentamethylene tetrazole).

RESULTS

It was found that a Cardiazol-shock immediately after passing the maze will wipe out part of the memory impact resulting from passing the maze. We have been able to ascertain that the wiping-out effect of the Cardiazol treatment with respect to the memory performance will be eliminated by 5-allyl-5-(2-hydroxyethyl)-barbituric acid. This result was obtained both in respect of the time required to pass the maze as well as by testing the number of errors in the maze test.

TOXICITY

Acute toxicity of the compound is very small. DL 50 p.o. (applied orally) is above 6.0 g./kg., i.p. (applied intraperitoneally) it is above 3.0 g./kg., and i.v. (applied intravenously) it is above 600 mg./kg.

Hypnotic barbituric acids, on the other hand, exhibit a toxicity which is about 10 times higher.

In view of the above results of pharmacological tests, the inventive compound should be used clinically mainly in such cases where a reduced oxygen and glucose utilization of the brain cells or the heart cells, respectively, plays a role in the pathogenesis. This is particularly the case in such ills, as migraine, post-traumatic syndrome, senile deficiencies, e.g. failing memory, further in the improvement of the memory capacity and the learning capacity of overfatigued or reconvalescent children and students. The improvement of the oxygen utilization of the heatr cells can be exploited for pectanginous states, for patients recovering following coronary thrombosis, etc.

The following examples are intended to illustrate and not to limit the invention. Percentages are by weight, temperatures are in degrees centigrade (° C.), g. stands for gram(s), ml. for milliliters and mm. for millimeters.

EXAMPLE 1

503 g. diethylester of monoallyl malonic acid are dissolved in a mixture of 1250 ml. of anhydrous alcohol and 58 g. sodium, and the resulting mixture is heated at 60° C. for one hour. Now, 308 g. 2-chloro-vinylethylether are added and the mixture is refluxed while stirring. Refluxing and agitation are continued until the solution is neutral to phenolphthalein. This will take about 50 hours. Then, excessive alcohol is removed by distillation and the residue is dissolved in water. The aqueous solution is extracted four times with benzene and then dried over sodium sulphate. The solvent is evaporated and the residue distilled fractionally under vacuum to yield 439 g. of diethylester of vinyl-oxyethyl-allyl-malonic acid. The yield is 64%; the product boils at 60–80° C./0.5 mm.

439 g. of the diethylester of vinyloxyethyl-allyl-malonic acid, 13 g. of sodium, 3150 ml. anhydrous alcohol and 239 g. urea are refluxed for 24 hours. The alcohol is removed by distillation and the residue is treated with ice-cold water. The product is extracted three times with ether. The aqueous phase is cooled to 0–5° C. Concentrated hydrochloric acid is added for a pH of 5.0. A crystalline material precipitates, and is dissolved in ether and the aqueous phase is extracted with ether to exhaustion. The ether is evaporated to yield a residue of 312 g. crude vinyloxyethyl-allyl barbituric acid. The yield is 81%.

312 g. of crude vinyloxyethyl-allyl-barbituric acid, 1700 ml. of water and 11 ml. of concentrated sulphuric acid are refluxed for three hours until no further development of acetaldehyde is noted. A crystalline matter precipitates, is removed by filtration and dissolved in ethyl acetate. The organic phase is washed with water until the water becomes neutral, and is then evaporated to yield a dry residue.

The aqueous liquor which contains sulphuric acid can be processed to yield an additional product portion by neutralization with aqueous sodium hydroxide to pH 6.0, saturation with sodium sulphate and extraction with ethyl acetate.

A total of 204 g. crude 5-allyl-5-(2-hydroxyethyl) barbituric acid is obtained. The yield is 73%.

For purification, the product is dissolved in a small amount of acetone and precipitated with ethylene chloride. The precipitated crystals are refluxed in chloroform, cooled, filtered, and washed subsequently with chloroform. The filtrate consists predominantly of diallyl barbituric acid. A total of 179 g. pure 5-allyl-5-(2-hydroxyethyl) barbituric acid is obtained and has a melting point of 163.8–165.4° C. (corrected). The yield is 88%.

If subject to thin layer chromatography, the 5-allyl-5-(2-hydroxyethyl) barbituric acid obtained according to this process exhibits only a very weak side spot indicating a maximum of 0.5% diallyl barbituric acid.

EXAMPLE 2

100 g. diethylester of monoallylmalonic acid are dissolved in a mixture of 250 ml. of anhydrous alcohol and 11.5 g. sodium and the resulting mixture is heated to 60° C. for one hour. After cooling to room temperature, 46 g. of 2-chloroethanol are added and the mixture is agitated at 40° C. for 16 hours. The alcohol is removed by distillation. The residue is dissolved in water and the solution is extracted with benzene. The extract is dried over sodium sulphate and the benzene solvent is removed by distillation.

The residue is fractionaly distilled under vacuum. The portion of the diethylester of monoallylmalonic acid not reacted is removed by distillation. A residue of 27 g. diethylester of hydroxyethylallyl malonic acid is obtained corresponding to a yield of 22%.

27 g. of the diethylester of hydroxyethylallyl malonic acid, 415 ml. of anhydrous ethanol, 7.6 g. of sodium and 19.6 g. of urea are refluxed at a water bath for 24 hours. The alcohol is removed by distillation. The residue is dissolved in ice water and the solution is extracted three times with ether. The remaining aqueous phase is cooled to 0–5° C. and concentrated hydrochloride acid is added for a pH of 5.0. The aqueous phase then is exhausted by extraction with ethyl acetate and the extract is heated to remove the extracting solvent and to yield a dry residue. Thus, 7 g. crude 5-allyl-5-(2-hydroxyethyl) barbituric acid are obtained. The yield is 30%.

7 g. of the crude 5-allyl-5-(2-hydroxyethyl) barbituric acid are dissolved in a small amount of acetone and precipitated with ethylene chloride. 4 g. of pure 5-allyl-5-(2-hydroxyethyl) barbituric acid are obtained. This product melts at 161.0–163.8° C. (corrected). The yield is 54%.

Many variations of the procedures set forth in the examples will be obvious to those skilled in the art. For example, solvents other than those mentioned can be used and other agents can be used as condensation agents, drying agents, etc.

What is claimed is:

1. A method of treating conditions encompassing a reduced utilization capacity of brain and heart cells for oxygen and glucose comprising administering to a patient an effective dosage of pure 5-allyl-5-(2-hydroxyethyl)-barbituric acid which is free of hypnotic effects in a compatible pharmaceutical carrier.

2. The method as defined in claim 1 wherein said pure 5-allyl-5-(2-hydroxyethyl)-barbituric acid dosage rate is at least 100 mg. per day.

References Cited

Chem. Abst. 59—7539e (1963).

STANLEY J. FRIEDMAN, Primary Examiner

U.S. Cl. X.R.

260—257